United States Patent
Park et al.

(10) Patent No.: US 11,936,542 B2
(45) Date of Patent: Mar. 19, 2024

(54) METHOD OF SOLVING PROBLEM OF NETWORK AND APPARATUS FOR PERFORMING THE SAME

(71) Applicant: Samsung Electronics Co., Ltd., Suwon-si (KR)

(72) Inventors: Sangkyu Park, Suwon-si (KR); Jonghwa Park, Suwon-si (KR); Youngsuk Sun, Suwon-si (KR); Yunju Lee, Suwon-si (KR); Panhyung Lee, Suwon-si (KR); Hakyung Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/828,579

(22) Filed: May 31, 2022

(65) Prior Publication Data
US 2022/0321439 A1    Oct. 6, 2022

Related U.S. Application Data

(63) Continuation of application No. PCT/KR2022/003410, filed on Mar. 11, 2022.

(30) Foreign Application Priority Data

Apr. 2, 2021    (KR) .................. 10-2021-0043101

(51) Int. Cl.
*H04L 43/08*    (2022.01)
*H04L 41/14*    (2022.01)

(52) U.S. Cl.
CPC ............ *H04L 43/08* (2013.01); *H04L 41/145* (2013.01)

(58) Field of Classification Search
None
See application file for complete search history.

(56) References Cited

U.S. PATENT DOCUMENTS

| | | | |
|---|---|---|---|
| 10,459,827 B1* | 10/2019 | Aghdaie | ............ G06F 11/0751 |
| 10,643,167 B2 | 5/2020 | Trenchard et al. | |
| 2017/0017698 A1* | 1/2017 | Bullotta | ............... G06Q 10/063 |
| 2017/0201897 A1 | 7/2017 | Yang et al. | |

(Continued)

FOREIGN PATENT DOCUMENTS

| | | |
|---|---|---|
| JP | H0916617 A | 1/1997 |
| JP | 2020115687 A | 7/2020 |

(Continued)

OTHER PUBLICATIONS

International Search Report dated Jun. 20, 2022, issued in International Patent Application No. PCT/KR2022/003410.

*Primary Examiner* — Kevin T Bates
*Assistant Examiner* — Dae Kim
(74) *Attorney, Agent, or Firm* — Jefferson IP Law, LLP

(57) ABSTRACT

A method of solving a problem of a network and an electronic device for performing the method are provided. The electronic device includes at least one processor. The processor may determine a representative cause representing a cause of each of anomaly samples of a quality indicator indicating a quality of the network. The processor may perform a time-series analysis on an indicator associated with the representative cause. The processor may propose a solution corresponding to the representative cause and a result of the time-series analysis.

11 Claims, 9 Drawing Sheets

(56) References Cited

U.S. PATENT DOCUMENTS

| | | |
|---|---|---|
| 2017/0295078 A1 | 10/2017 | Medas et al. |
| 2019/0155709 A1 | 5/2019 | De Oliveira et al. |
| 2019/0227504 A1 | 7/2019 | Ma et al. |
| 2019/0318288 A1 | 10/2019 | Noskov et al. |
| 2020/0092159 A1 | 3/2020 | Thampy et al. |
| 2020/0134534 A1 | 4/2020 | Malapaka |
| 2020/0183946 A1* | 6/2020 | Pelloin .................... G06F 17/18 |
| 2020/0322367 A1* | 10/2020 | Salvat Lozano .... H04L 41/5009 |
| 2020/0380074 A1* | 12/2020 | Li ......................... G06F 16/313 |
| 2021/0049143 A1* | 2/2021 | Jacinto ................. G06F 16/285 |
| 2021/0067401 A1* | 3/2021 | Abe ...................... H04L 41/069 |
| 2022/0321436 A1* | 10/2022 | Kandhasamy Narayanan ............ H04L 41/145 |

FOREIGN PATENT DOCUMENTS

| | | |
|---|---|---|
| KR | 10-2016-0081321 A | 7/2016 |
| KR | 10-2020-0028305 A | 3/2020 |

* cited by examiner

| Cause category 801 | Associated features 803 | Time-series pattern of associated features 805 | Combined cause 807 | Proposed solution 809 |
|---|---|---|---|---|
| High traffic load | DL_Active_UEs | Lasting increase | High traffic load with increasing UEs | · Configure load-balancing related parameters to offload traffic<br>· Deploy more cells |
| High traffic load | DL_Active_UEs | Temporal increase | High traffic load with abruptly increased UEs | · Active (or trigger) load balancing of this cell<br>· Keep monitoring traffic load trend of this cell (Notification) |
| Lack of user traffic | DL_Active_UEs<br>RRC_UEs | Normal<br>Normal | Lack of user traffic in late night | · Not needed |
| Lack of user traffic | DL_Active_UEs<br>RRC_UEs | Temporal decrease<br>Temporal decrease | Lack of user traffic | · N/A |
| Not available cell | Cell_Availability/DSP Fail | Temporal change | Cell is not available due to temporal DSP fail event | · Reset DU or DSP |
| Not available cell | Cell_Availability/DSP Fail | Lasting change | Not available cell due to lasting DSP fail events | · Reset DU or DSP<br>· Trouble shooting process |
| Not available cell | Cell_Availability/Admin locked | Temporal change | Cell is not available due to being temporal admin-locked status | · Wait until ongoing maintenance job to be completed |
| Not available cell | Cell_Availability/Admin locked | Lasting change | Cell is not available due to lasting admin-locked status | · Check ongoing maintenance job status |

FIG.8

METHOD OF SOLVING PROBLEM OF NETWORK AND APPARATUS FOR PERFORMING THE SAME

CROSS-REFERENCE TO RELATED APPLICATION(S)

This application is a national stage of an international application number PCT/KR2022/003410, filed on Mar. 11, 2022, which is based on and claims the benefit of a Korean patent application number 10-2021-0043101, filed on Apr. 2, 2021, in the Korean Intellectual Property Office, the disclosure of which is incorporated by reference herein in its entirety.

BACKGROUND

1. Field

The disclosure relates to solving a problem in a network. More particularly, the disclosure relates to a method of solving degradation in a quality of a communication network.

2. Description of Related Art

If an issue occurs in a quality of a mobile network, and if a cause is analyzed using only a quality indicator at a point in time when the issue occurs, a state of an entity or a cell associated with the point in time may be known, but it is difficult to identify time-series information such as temporality, persistence or repeatability of the issue. Accordingly, it is difficult for a network administrator to perform selective troubleshooting based on urgency or importance, and there are limitations in determining the intrinsic issue solution. The troubleshooting refers to comprehensively diagnosing and processing complex issues that occur in a system.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device that may derive a more comprehensive cause for a degradation interval of a quality indicator and that may propose a solution, through a root cause analysis.

The quality indicator may be information indicating a quality of a network and may include, for example, a key performance indicator (KPI) indicating a quality of a mobile communication network.

Additional aspects will be set forth in part in the description which follows and, in part, will be apparent from the description, or may be learned by practice of the presented embodiments.

In accordance with an aspect of the disclosure, an electronic device is provided. The electronic device includes at least one processor, and the processor is configured to determine a first time interval for detecting an anomaly of a quality indicator indicating a quality of a network, detect one or more anomaly samples of the quality indicator of the network during the first time interval, determine a representative cause representing a cause of each of the one or more anomaly samples, perform a time-series analysis on a feature associated with the representative cause during a second time interval including the first time interval, and propose a solution corresponding to the representative cause and a result of the time-series analysis.

In accordance with another aspect of the disclosure, a method of solving a problem of a network is provided. The method includes determining a first time interval for detecting an anomaly of a quality indicator indicating a quality of the network, detecting one or more anomaly samples of the quality indicator of the network during the first time interval, determining a representative cause representing a cause of each of the one or more anomaly samples, performing a time-series analysis on a feature associated with the representative cause during a second time interval including the first time interval, and proposing a solution corresponding to the representative cause and a result of the time-series analysis. The performing of the time-series analysis may include determining a time corresponding to a predetermined sample prior to a start time of the first time interval as a start time of the second time interval, and analyzing a trend, a seasonality or a residual component of the associated feature during the second time interval.

However, the technical aspects are not limited to the aforementioned aspects, and other technical aspects may be present.

According to example embodiments, an electronic device may derive a more comprehensive cause for a degradation interval of a quality indicator through a root cause analysis and may propose a solution.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 8 is a diagram illustrating various examples from an analysis of a representative cause to a proposal of a solution by an electronic device according to an embodiment of the disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
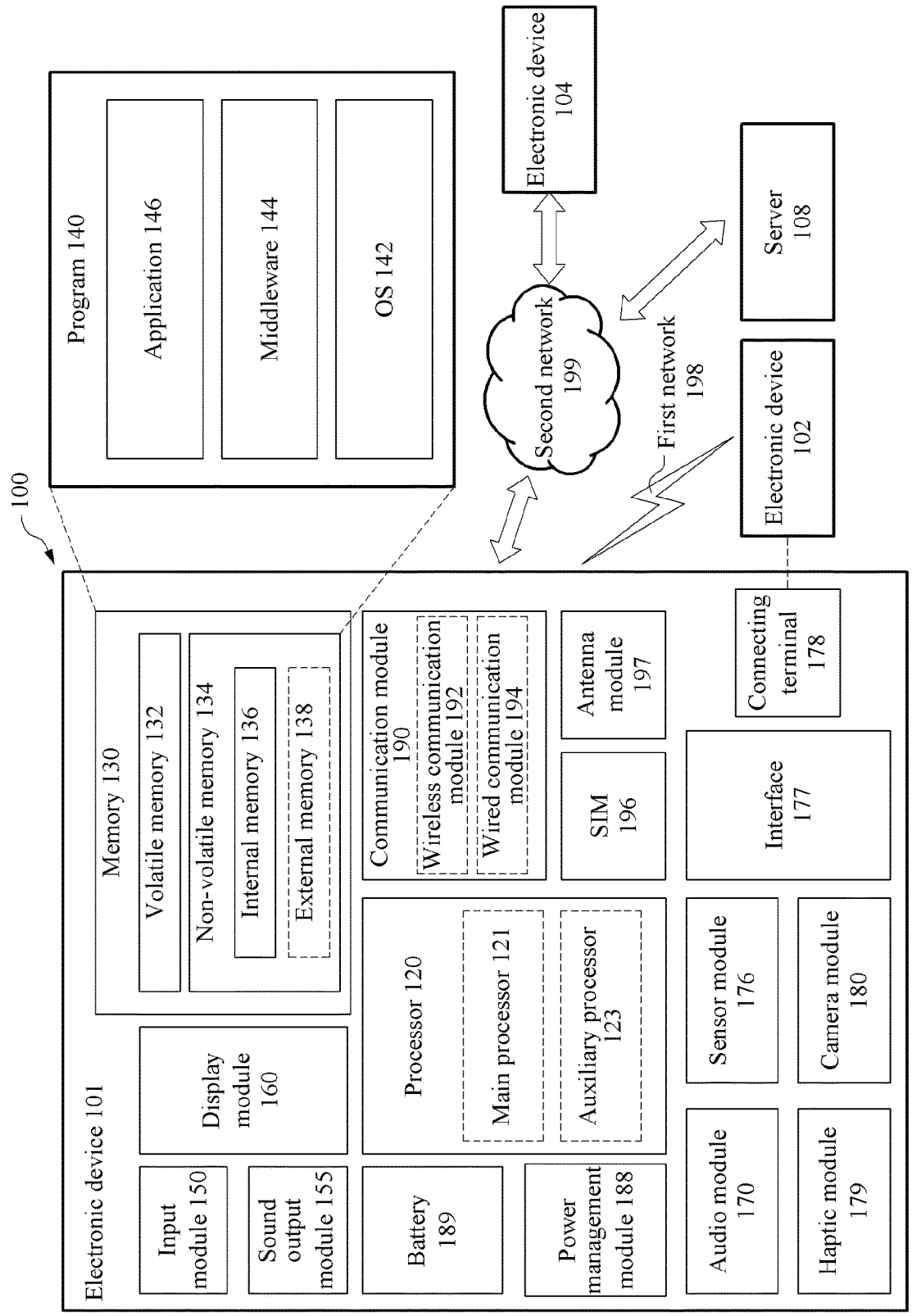
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some example embodiments, at least one of the components (e.g., the connecting terminal 178) may be omitted from the electronic device 101, or one or more other components may be added in the electronic device 101. In some example embodiments, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence model processing. An artificial intelligence model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an example embodiment, the display module 160 may include a touch sensor adapted to detect a touch, or a pressure sensor adapted to measure the intensity of force incurred by the touch.

The audio module 170 may convert a sound into an electric signal or vice versa. According to an example embodiment, the audio module 170 may obtain the sound via the input module 150 or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, image signal processors, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., a LAN or a wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an example embodiment, all or some of operations to be executed by the electronic device 101 may be executed at one or more external electronic devices (e.g., the external electronic devices 102 and 104, and the server 108). For example, if the electronic device 101 needs to perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various example embodiments may be one of various types of electronic devices. The electronic device may include, for example, a portable communication device (e.g., a smartphone), a computer device, a portable multimedia device, a portable medical device, a camera, a wearable device, or a home appliance device. According to an example embodiment of the disclosure, the electronic device is not limited to those described above.

It should be appreciated that various example embodiments of the disclosure and the terms used therein are not intended to limit the technological features set forth herein to particular example embodiments and include various changes, equivalents, or replacements for a corresponding example embodiment. In connection with the description of the drawings, like reference numerals may be used for similar or related components. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and may refer to components in other aspects (e.g., importance or order) is not limited. It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various example embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

Various example embodiments as set forth herein may be implemented as software (e.g., the program 140) including one or more instructions that are stored in a storage medium (e.g., an internal memory 136 or an external memory 138) that is readable by a machine (e.g., the electronic device 101) For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an example embodiment, a method according to various example embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components may be omitted, or one or more other components may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

Figure 2:
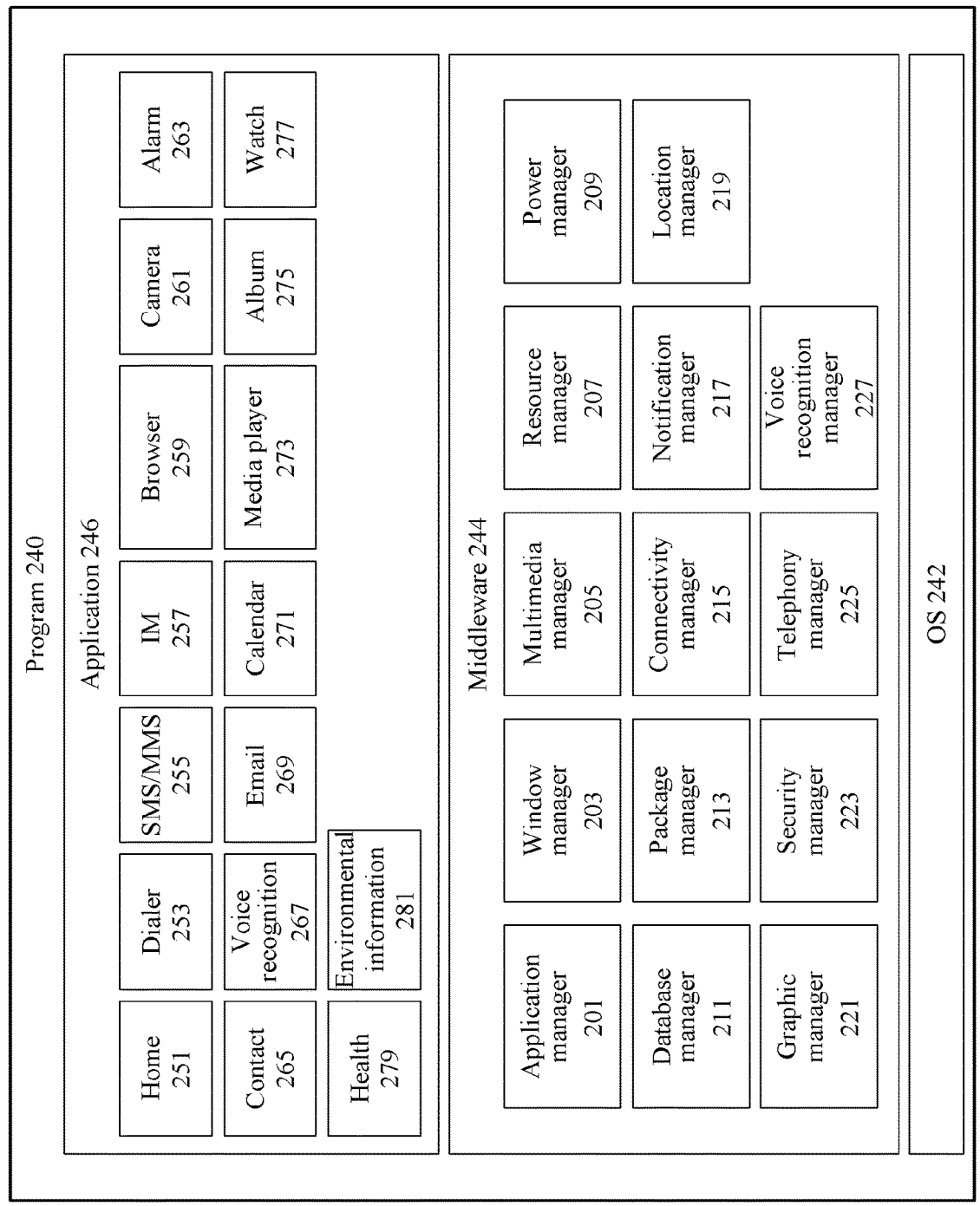
FIG. 2 is a block diagram illustrating a program according to an embodiment of the disclosure.

FIG. 2 is a block diagram illustrating a program according to an embodiment of the disclosure.

Referring to FIG. 2, according to an example embodiment, a system 200 may include a program 240, which may include an OS 242 to control one or more resources of an electronic device (e.g., the electronic device 101 of FIG. 1), middleware 244, or an application 246 executable in the OS 242. The OS 242 may include, for example, Android™, iOS™, Windows™, Symbian™, Tizen™, or Bada™. At least part of the program 240, for example, may be pre-loaded on the electronic device 101 during manufacture, or may be downloaded from or updated by an external electronic device (e.g., the electronic device 102 or 104, or the server 108) during use by a user.

The OS 242 may control management (e.g., allocation or deallocation) of one or more system resources (e.g., a process, a memory, or a power source) of the electronic device 101. The OS 242 may additionally or alternatively include another one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the SIM 196, or the antenna module 197.

The middleware 244 may provide various functions to the application 246 such that a function or information provided from one or more resources of the electronic device 101 may be used by the application 246. The middleware 244 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201 may, for example, manage the life cycle of the application 246. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 246 or a memory space of the memory 130. The power manager 209, for example, may manage the capacity, temperature, or power of the battery 189, and may determine or provide related information to be used for the operation of the electronic device 101 based on at least in part on corresponding information of the capacity, temperature, or power of the battery 189. According to an example embodiment, the power manager 209 may interwork with a basic input/output system (BIOS) (not shown) of the electronic device 101.

The database manager 211, for example, may generate, search, or change a database to be used by the application 246. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, a message, or an alert). The location manager 219, for example, may manage location information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit user's voice data to the server 108, and may receive, from the server 108, a command corresponding to a function to be executed on the electronic device 101 based on at least in part on the voice data, or text data converted based on at least in part on the voice data. According to an example embodiment, the middleware 244 may dynamically delete some existing components or add new components. According to an example embodiment, at least part of the middleware 244 may be included as a part of the OS 242 or implemented as another software separate from the OS 242.

The application 246 may include, for example, a home 251, dialer 253, short message service (SMS)/multimedia messaging service (MIMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an example embodiment, the application 246 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control a power source (e.g., turning on or off) or a function (e.g., brightness, resolution, or focus) of an external electronic device that communicates with the electronic device 101 or a portion of components of the external electronic device (e.g., a display module or a camera module). The device management application may additionally or alternatively support installation, delete, or update of an application running on the external electronic device.

In the following examples, operations may be performed sequentially, but not necessarily performed sequentially. For example, the order of the operations may be changed and at least two of the operations may be performed in parallel.

Figure 3:
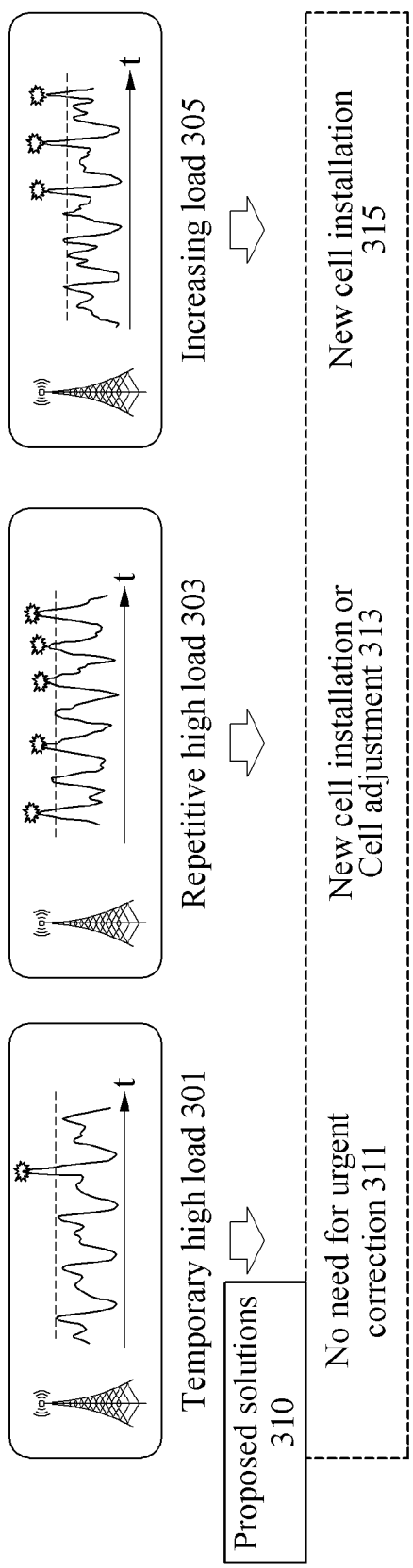
FIG. 3 is a diagram illustrating an example of solving a problem of a network by an electronic device according to an embodiment of the disclosure.

FIG. 3 is a diagram illustrating an example of solving a problem of a network by an electronic device according to an embodiment of the disclosure.

Referring to FIG. 3, according to an example embodiment, an electronic device (e.g., the electronic device 101 of FIG. 1) may detect a quality degradation of a communication network (e.g., the second network 199 of FIG. 1). The electronic device may analyze a root cause of the detected quality degradation. The electronic device may propose a solution to address the root cause. For example, the electronic device may analyze a root cause of an anomaly or degradation of a key performance indicator (KPI) that is one of quality indicators of a mobile communication network and may provide a solution corresponding to the root cause. In the example embodiments, the anomaly may include degradation.

The electronic device may detect an anomaly sample in the communication network. The anomaly sample may refer to a sample showing an anomaly or degradation of the KPI. The electronic device may derive causes for each anomaly sample using one or more features. The electronic device may classify a cause of each anomaly sample based on an analysis target to be analyzed. The analysis target used for cause classification may include, for example, performance management (PM), fault management (FM), configuration management (CM) and log data, or metrics calculated from the above data.

The electronic device may determine a first time interval for detecting an anomaly of a quality indicator, and may determine a representative cause of a corresponding time interval. The first time interval may be an interval in which a communication quality decreases, and may also be referred to as a "degradation interval". The electronic device may derive a representative cause through pattern matching based on a matching relationship corresponding to the representative cause among one or more predetermined matching relationships. The representative cause may refer to a cause representing causes of a plurality of anomaly samples occurring in the first time interval.

The electronic device may display, using a GUI, a feature value and a feature list for a derived cause of each anomaly sample and a representative cause of the degradation interval. The electronic device may display a GUI using a display module (e.g., the display module 160 of FIG. 2).

The electronic device may determine a second time interval in which a time-series analysis is to be performed, and an associated feature. The associated feature may refer to a feature associated with a representative cause. The second time interval may refer to a target time interval in which a time-series analysis is to be performed. The second time interval may include the first time interval. The electronic device may perform a time-series analysis on an associated feature of a corresponding time interval. The electronic device may derive a combined cause by aggregating the representative cause and a result of the time-series analysis. The combined cause may refer to a cause derived by aggregating the representative cause and a result of a time-series analysis.

The electronic device may derive a combined cause by aggregating the result of the time-series analysis and the representative cause derived through pattern matching. The electronic device may display the combined cause as a string. For example, the electronic device may generate a string of a combined cause by connecting a string of the representative cause and a string of a time-series analysis result and may display the string of the combined cause. The electronic device may display the string of the combined cause through the display module (e.g., the display module 160 of FIG. 2).

The electronic device may pre-set a matching relationship between the combined cause and a proposed solution for the combined cause. For example, the matching relationship between the combined cause and the solution may be set manually by a user. For example, the matching relationship between the combined cause and the solution may be automatically set. The matching relationship may be displayed in a form of a mapping table.

The electronic device may propose a solution to the combined cause. The electronic device may propose a solution corresponding to the combined cause derived from a preset matching relationship. The electronic device may display the combined cause and the solution corresponding to the combined cause, using a GUI. The electronic device may display a GUI using a display module (e.g., the display module 160 of FIG. 2).

Referring to FIG. 3, the electronic device may monitor a quality indicator of the communication network. The electronic device may determine a frequency of occurrences of anomaly samples for a predetermined period of time. In a state 301, the electronic device may determine that the frequency of occurrences of anomaly samples is less than or equal to a predetermined level. The electronic device may determine that the quality is degraded due to a temporary high load. As a proposed solution 310, the electronic device may present a conclusion 311 that there is no need for an urgent correction.

In a state 303, the electronic device may determine that an anomaly sample repeatedly occurs for a predetermined period of time. The electronic device may determine a cause of each anomaly sample through pattern matching based on existing data. For example, the electronic device may determine the most common cause as a representative cause.

In a state 303, the electronic device may perform a time-series analysis on a feature associated with the representative cause during a greater time interval including a time interval in which an anomaly sample occurs. The electronic device may estimate a directionality and a trend of a feature as a result of the time-series analysis.

The electronic device may determine that the quality is degraded due to a repetitive high load as the representative cause and the result of the time-series analysis. As a proposed solution 310, the electronic device may propose a solution 313 to install a new cell or adjust a cell.

In a state 305, the electronic device may determine that a number of anomaly samples or intensity of anomaly samples gradually increases for a predetermined period of time. The electronic device may determine a cause of each anomaly sample through pattern matching based on existing data. The electronic device may determine the most common cause as a representative cause.

In the state 305, the electronic device may perform a time-series analysis on a feature associated with the representative cause during a greater time interval including a time interval in which an anomaly sample occurs. The electronic device may estimate a directionality and a trend of a feature as a result of the time-series analysis.

The electronic device may determine an increase of the load of a cell due to a significant increase in a number of user equipments (UEs) as a cause of degradation in the KPI), based on the result of the time-series analysis associated with the representative cause. Accordingly, the electronic device may propose a solution 315 to install a new cell in a corresponding area.

Thus, the electronic device may derive a more comprehensive cause for a degradation interval of a quality indicator on which a root cause analysis (RCA) is to be performed. The electronic device may derive a representative cause through pattern matching based on various indicators associated with a communication quality. The electronic device may perform a time-series analysis on a feature associated with a quality indicator for a predetermined time interval to derive an analysis result. The electronic device may derive a combined cause by aggregating the representative cause and the analysis result. The electronic device may propose a solution to address the combined cause.

The electronic device may provide an analysis result for a more fundamental cause by providing a time-series pattern analysis of a trend component, from which seasonality or noise is removed, in features associated with a KPI degradation for an RCA. The electronic device may estimate whether a phenomenon corresponding to a root cause temporarily or persistently occurs, and may determine whether the phenomenon is increasing or decreasing. Thus, the electronic device may determine urgency and importance of solving the phenomenon. The electronic device may contribute to an automation of a network operation by analyzing a cause of a problem and presenting a solution corresponding to an analysis result.

Figure 4:
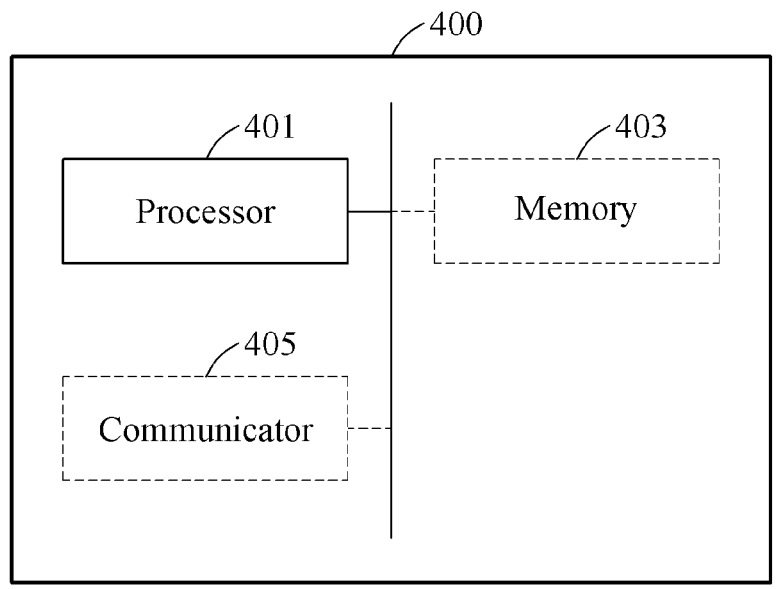
FIG. 4 is a diagram illustrating a configuration of an electronic device according to an embodiment of the disclosure.

FIG. 4 is a diagram illustrating a configuration of an electronic device according to an embodiment of the disclosure.

Referring to FIG. 4, according to an example embodiment, an electronic device 400 (e.g., the electronic device 101 of FIG. 1) may include at least one processor 401 (e.g., the processor 120 of FIG. 1). The electronic device 400 may further include a memory 403 (e.g., the memory 130 of FIG. 1). The electronic device 400 may further include a communicator 405 (e.g., the communication module 190 of FIG. 1).

The processor 401 may determine a representative cause representing a cause of each anomaly sample of a quality indicator indicating a quality of a network. The processor 401 may perform a time-series analysis on an indicator associated with the representative cause. The processor 401 may propose a solution corresponding to the representative cause and a result of the time-series analysis. Hereinafter, the indicator may also be referred to as a "feature".

The processor 401 may determine a first time interval for detecting an anomaly of a quality indicator indicating a quality of a network (e.g., the second network 199 of FIG. 2). If an anomaly sample showing an anomaly or degradation of a KPI consecutively occurs within a predetermined time interval, the electronic device may set a position of N samples (N_begin samples) previous to a first sample as a start point. The electronic device may set a position of N samples (N_end samples) after a last sample as an end point.

The processor 401 may detect one or more anomaly samples of the quality indicator of the network during the first time interval. The electronic device may detect an anomaly sample showing an anomaly or degradation of a KPI based on a variety of criteria. For example, if a KPI of a predetermined sample is less than a threshold, the electronic device may determine the sample as an anomaly sample. The electronic device may determine a statistical outlier or a time-series outlier as an anomaly sample.

According to an example embodiment, the processor 401 may determine a cause of each of the one or more anomaly samples. The processor 401 may determine a cause of each of the one or more anomaly samples based on a corresponding relationship between a predetermined anomaly sample and a cause using an association rule technique of data mining. The electronic device may classify a cause of each anomaly sample based on features used for cause classification in a rule-based manner. The electronic device may find a rule of a feature combination used for cause classification, using the association rule technique. The association rule technique may be mainly used in a field of data mining and may refer to a scheme of representing how often events occur together, which event occurs, and how events are related to each other.

The electronic device may determine a cause of each of the one or more anomaly samples based on the corresponding relationship between the predetermined anomaly sample and the cause using the association rule technique of data mining. For example, an association rule algorithm may include an algorithm such as a frequency pattern (FP)-growth algorithm or an apriori algorithm, but is not limited thereto. The electronic device may find a combination of features that occur together at a high frequency when an anomaly or degradation of a KPI appears from data collected in the past.

For example, target data to be analyzed may include PM, FM, CM and log data, or metrics calculated from the above data. A feature may include, for example, a KPI, a counter, an alarm, and a status value for an analysis target, metrics calculated using the above features, or statistical values thereof.

The electronic device may give a meaning to a set of rules found using the association rule technique. The giving of the meaning may also be referred to as "cause labeling". The electronic device may store a set of labeled rules in a database. The electronic device may derive a cause by performing pattern matching on a sample showing an anomaly or degradation of a KPI which newly occurs, based on the set of the labeled rules stored in the database.

According to an example embodiment, the processor 401 may input one or more anomaly samples to a neural network that is trained based on a plurality of pieces of training data associated with a corresponding relationship between an anomaly sample and a cause. The processor 401 may determine a cause of each of the one or more anomaly samples from an output of the neural network.

The electronic device may classify a cause of each anomaly sample using a machine learning technique. For example, the electronic device may analyze the cause using a technique such as clustering, a decision tree or a neural network. The electronic device may classify a cause of a new anomaly sample using a neural network that is trained using a large quantity of training data labeled with causes for anomaly samples.

The processor 401 may determine a representative cause representing each cause of the one or more anomaly samples. The processor 401 may determine a representative cause representing one or more causes. The processor 401 may determine a most common cause among causes of the one or more anomaly samples as a representative cause.

The processor 401 may determine a cause of each anomaly sample through pattern matching. In an example, the processor 401 may determine a cause corresponding to a pattern most frequently occurring during the first time interval as a representative cause. In another example, the processor 401 may determine a cause corresponding to an anomaly sample with a greatest anomaly or degradation of a KPI in the first time interval as a representative cause of the first time interval. The example embodiments are not limited to the above examples, and various schemes of determining a representative cause may be selected.

The processor 401 may perform a time-series analysis on a feature associated with the representative cause during a second time interval including the first time interval. To this end, the processor 401 may determine the second time interval in which a time-series analysis is to be performed, and an associated feature.

The processor 401 may determine the second time interval in which the time-series analysis is to be performed. The processor 401 may determine the second time interval including the first time interval. The processor 401 may determine a time corresponding to a predetermined sample prior to a start time of the first time interval as a start time of the second time interval.

For example, the electronic device may set a position of N samples (N_begin samples) previous to a first sample of a degradation interval in which a communication quality is degraded as a starting point. The electronic device may set an end point of the first time interval as an end point of the second time sphere. The electronic device may set a position of N samples (N_end samples) after a last sample of the degradation interval as an end point. However, the above scheme is merely an example, and various time intervals may be applied depending on features to be analyzed. The second time interval may be determined to include the first time interval, or may be the same as the first time interval.

The electronic device may determine a feature on which a time-series analysis is to be performed. The processor 401 may determine a feature associated with the representative cause. The associated feature may include, for example, a KPI, a counter, an alarm, and a status value for an analysis target, metrics calculated using the above features, or statistical values thereof.

The electronic device may perform a time-series analysis on a feature associated with a representative cause of an anomaly sample of a time interval in which a communication quality is degraded. The processor 401 may perform a time-series analysis on a moving average of the associated feature, a result obtained by performing fitting by a regression model, a prediction value by a prediction algorithm.

The processor 401 may perform a time-series analysis on the feature associated with the representative cause during the second time interval. The processor 401 may classify a time-series pattern for various features associated with a cause of an anomaly sample, for example, KPIs, counters, alarms, and status values of PM/FM/CM data, or metrics calculated based on them.

The processor 401 may also perform a time-series analysis based on values derived from the feature as well as the feature itself. For example, a target for a time-series analysis may include a moving average or an exponential moving average, a result obtained by performing fitting by a regression model, and a value predicted by a time-series prediction algorithm, or time-series data including a trend, a seasonality or residual components.

The processor 401 may classify time-series patterns using various techniques. In an example, the processor 401 may perform a time-series analysis using a seasonal and trend decomposition using loess (STL) technique or a prophet technique. In another example, the processor 401 may utilize a moving average time series, an exponential moving average time series, a time series fitted by a regression model or a prediction time series by a prediction algorithm in time-series pattern classification.

If the STL technique is used, the processor 401 may analyze a trend, seasonality, or a residual component of an associated feature for the second time interval. The residual component may be referred to as "noise". The processor 401 may analyze a directionality of a feature and a root cause, from which the seasonality and noise are mitigated, using the STL technique. The processor 401 may derive a directionality of a trend. For example, the processor 401 may determine whether the trend increases or decreases. The processor 401 may classify a shape of a time series of a trend component. The shape of the time series of the trend component may be referred to as a "shape type." The processor 401 may define a sequence corresponding to the shape type to be classified. The processor 401 may calculate a shape-based distance using an algorithm such as a dynamic time warping (DTW) algorithm. The processor 401 may classify the trend component as a shape type corresponding to a sequence with a most similar shape based on the shape-based distance.

The processor 401 may estimate an effective variation of a trend using a linear regression model. The processor 401 may approximate the trend component to a linear line and calculate a rate of change of the trend based on an approximation result.

The electronic device 400 may further include a display module (e.g., the display module 160 of FIG. 1). The processor 401 may visualize a time-series analysis result and provide the visualized time-series analysis result. The processor 401 may provide a GUI for displaying a time-series analysis result for a feature associated with a degradation phenomenon of a KPI for an RCA. The display module may display a map showing a time-series pattern distribution of features associated with a KPI (or a key quality indicator (KQI)) for an RCA. If an eNB/cell displayed on the map is selected, the display module may display a GUI including a detailed analysis result.

For example, the processor 401 may use an abnormal score of a related KPI. The processor 401 may calculate a difference between a machine learning-based predicted value and the abnormal score, and may use a calculation result. The processor 401 may calculate a difference between the abnormal score and a prediction value that is based on statistics such as a moving average, and may use a calculation result.

The processor 401 may provide a GUI for selecting a scheme of calculating an abnormal score of a related KPI for a time-series analysis. The processor 401 may provide a GUI for selecting a detection target option for trend classification in a time-series analysis. The display module may visualize and display a shape type of a trend of a feature on which a time-series analysis is to be performed.

Thus, the processor 401 may derive an effective variation as well as a directionality of the trend, from which seasonality or noise is removed, and may determine whether the trend of the feature increases or decreases.

The processor 401 may derive a combined cause by aggregating the result of the time-series analysis and the representative cause derived through pattern matching. The processor 401 may generate a string of the combined cause by connecting a string of the representative cause and a string of the result of the time-series analysis, and may display the string of the combined cause. The processor 401 may generate a combined string based on a time-series analysis result and a representative cause of a degradation interval. For example, the processor 401 may generate a combined string such that a representative cause and a time-series analysis result may be expressed in the same string, such as "Heavy DL traffic load due to increasing trend of number of UEs".

The processor 401 may propose a solution corresponding to the representative cause and the result of the time-series analysis. The processor 401 may provide a more comprehensive solution to the root cause by proposing a solution to the combined cause. The processor 401 may propose a solution corresponding to the combined cause using a matching relationship between a stored combined cause and a solution. The processor 401 may generate a string by combining a string of the combined cause and a string of the solution and display the string.

According to an example embodiment, an electronic device 101 may include at least one processor 401. The processor 401 may be configured to determine a first time interval for detecting an anomaly of a quality indicator indicating a quality of a network, detect one or more anomaly samples of the quality indicator of the network during the first time interval, determine a representative cause representing a cause of each of the one or more anomaly samples, perform a time-series analysis on a feature associated with the representative cause during a second time interval including the first time interval, and propose a solution corresponding to the representative cause and a result of the time-series analysis.

The processor 401 may determine a cause of each of the one or more anomaly samples, and determine a representative cause representing causes of the one or more anomaly samples.

The processor 401 may determine a cause of each of the one or more anomaly samples based on a corresponding relationship between a predetermined anomaly sample and a cause using an association rule technique of data mining.

The processor 401 may input the one or more anomaly samples to a neural network that is trained based on a plurality of pieces of training data associated with a corresponding relationship between an anomaly sample and a cause, and determine a cause of each of the one or more anomaly samples from an output of the neural network.

The processor 401 may determine a most common cause among respective causes of the one or more anomaly samples as the representative cause.

The processor 401 may determine the second time interval including the first time interval, determine a feature associated with the representative cause, and perform a time-series analysis on the feature associated with the representative cause during the second time interval.

The processor 401 may determine a time corresponding to a predetermined sample prior to a start time of the first time interval as a start time of the second time interval.

The processor 401 may analyze a trend, a seasonality or a residual component of the associated feature during the second time interval.

The processor 401 may perform a time-series analysis on a moving average of the associated indicator, a result obtained by performing fitting by a regression model, and a prediction value by a prediction algorithm.

According to an example embodiment, an electronic device 400 (e.g., the electronic device 101 of FIG. 1) may include at least one processor 401 (e.g., the processor 120 of FIG. 1). The processor 401 may be configured to determine a first time interval for detecting an anomaly of a quality indicator indicating a quality of a network, detect one or more anomaly samples of the quality indicator of the network during the first time interval, determine a representative cause representing a cause of each of the one or more anomaly samples, perform a time-series analysis on a feature associated with the representative cause during a second time interval including the first time interval, and propose a solution corresponding to the representative cause and a result of the time-series analysis.

The processor 401 may determine a cause of each of the one or more anomaly samples, and determine a representative cause representing causes of the one or more anomaly samples.

The processor 401 may determine a cause of each of the one or more anomaly samples based on a corresponding relationship between a predetermined anomaly sample and a cause using an association rule technique of data mining.

The processor 401 may input the one or more anomaly samples to a neural network that is trained based on a plurality of pieces of training data associated with a corresponding relationship between an anomaly sample and a cause, and determine a cause of each of the one or more anomaly samples from an output of the neural network.

The processor 401 may determine a most common cause among respective causes of the one or more anomaly samples as the representative cause.

The processor 401 may determine the second time interval including the first time interval, determine a feature associated with the representative cause, and perform a time-series analysis on the feature associated with the representative cause during the second time interval.

The processor 401 may determine a time corresponding to a predetermined sample prior to a start time of the first time interval as a start time of the second time interval.

The processor 401 may analyze a trend, a seasonality or a residual component of the associated feature during the second time interval.

The processor 401 may perform a time-series analysis on a moving average of the associated indicator, a result obtained by performing fitting by a regression model, and a prediction value by a prediction algorithm.

Figure 5:
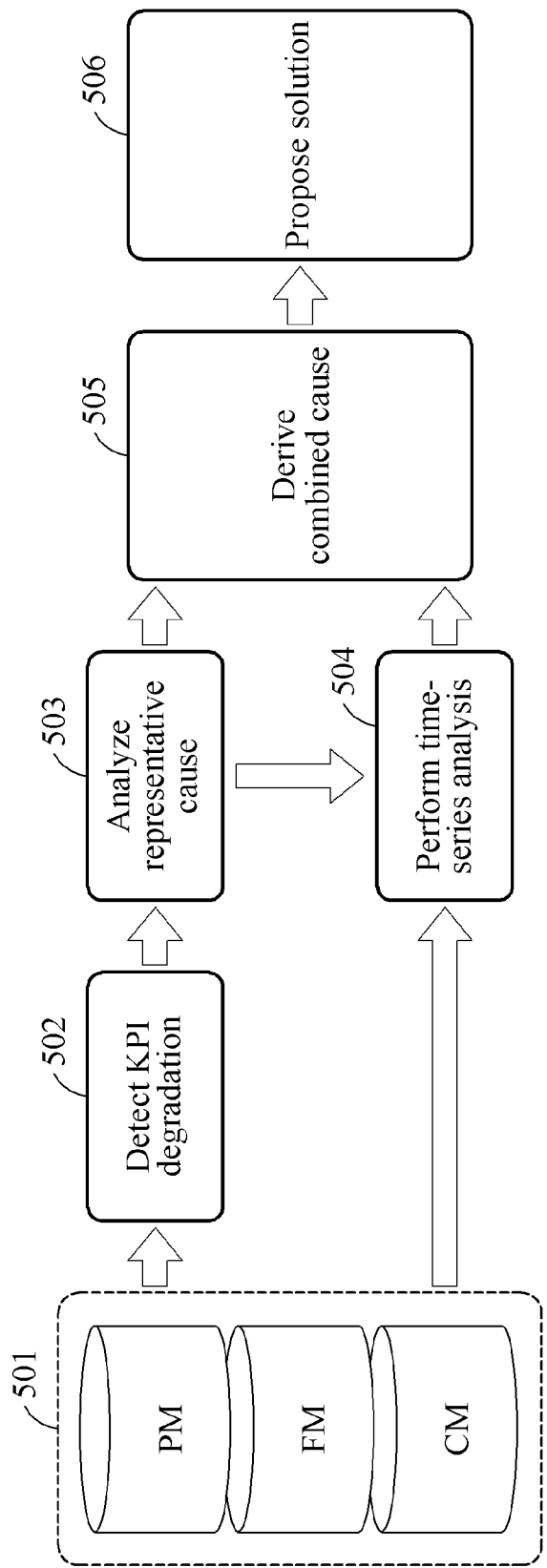
FIG. 5 is a flowchart illustrating an example of solving a problem of a network by an electronic device according to an embodiment of the disclosure.

FIG. 5 is a flowchart illustrating an example of solving a problem of a network by an electronic device according to an embodiment of the disclosure.

Referring to FIG. 5, an electronic device (e.g., the electronic device 101 of FIG. 1) may provide more detailed information about a degradation interval of a KPI for an RCA, using a result obtained by performing a time-series analysis algorithm, and propose a solution. In operation 502, the electronic device may detect a KPI degradation for an analysis target 501. The analysis target 501 may include PM, FM, and CM.

In operation 503, the electronic device may analyze causes of anomaly samples detected as a result of detecting the KPI degradation. The electronic device may determine a cause of each anomaly sample through pattern matching. The electronic device may determine a cause of each anomaly sample by substituting a predetermined pattern based on data collected in the past.

The electronic device may determine a representative cause among causes of the anomaly samples. In an example, the electronic device may determine a cause corresponding to a most frequently occurring pattern as a representative cause. In another example, the electronic device may determine a cause corresponding to an anomaly sample with a greatest anomaly or degradation of a KPI as a representative cause.

In operation 504, the electronic device may perform a time-series analysis during a time interval in which an anomaly sample is detected. The electronic device may perform a time-series analysis during a time interval for a feature associated with the representative cause. For example, the electronic device may estimate a directionality and a trend of the feature.

In operation 505, the electronic device may derive a combined cause by aggregating a result of the time-series analysis and a representative cause through pattern matching. The electronic device may generate a string of the combined cause by connecting a string of the representative cause and a string of the result of the time-series analysis, and may display the string of the combined cause.

In operation 506, the electronic device may propose a solution to the combined cause. A database of a matching relationship of the solution to the combined cause may be constructed in advance based on previous data. The electronic device may propose a solution matching the combined cause in the matching relationship stored in the database.

Figure 6:
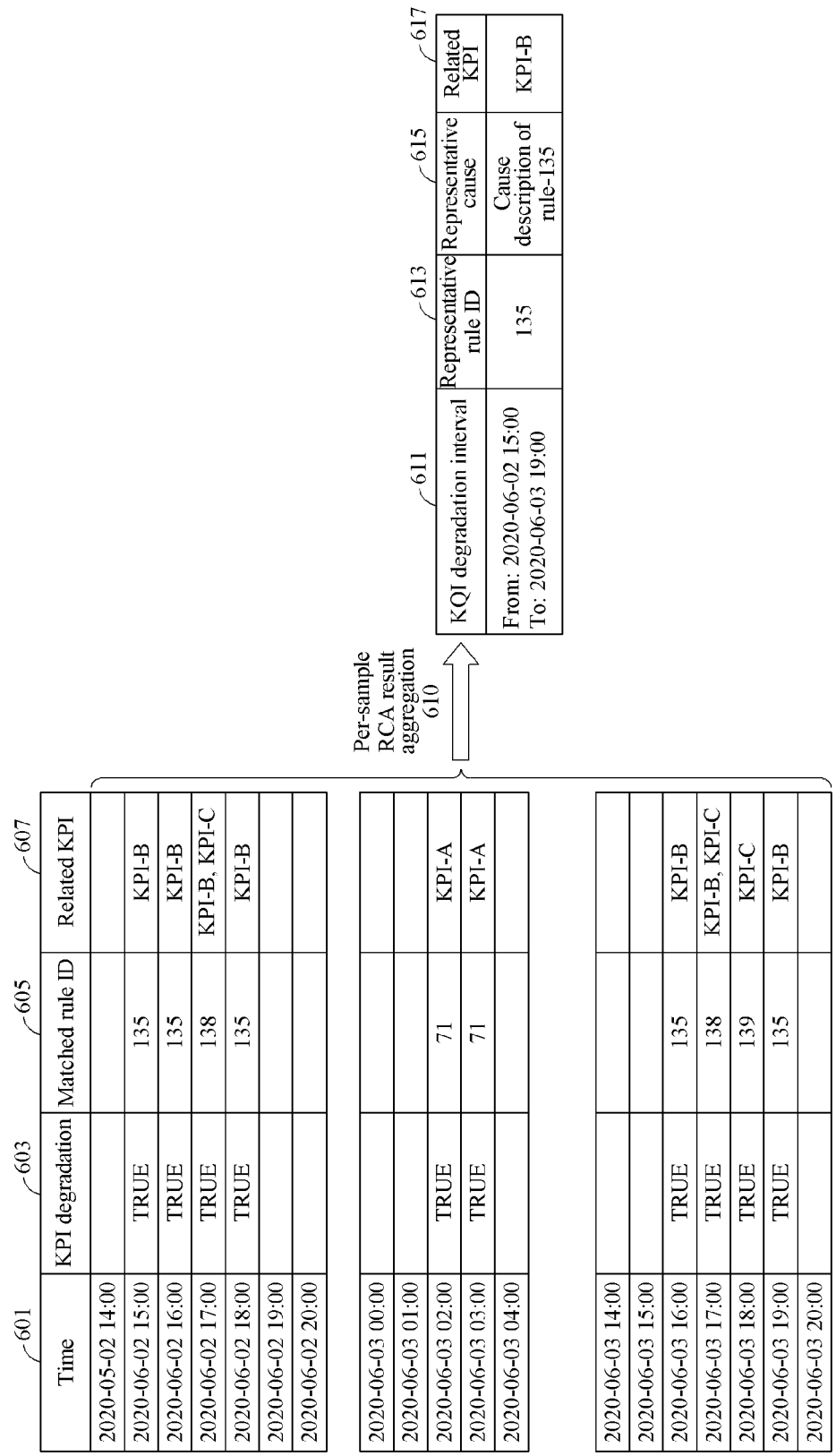
FIG. 6 is a diagram illustrating an example of analyzing a representative cause by an electronic device according to an embodiment of the disclosure.

FIG. 6 is a diagram illustrating an example of analyzing a representative cause by an electronic device according to an embodiment of the disclosure.

An electronic device (e.g., the electronic device 101 of FIG. 1) may pre-construct a database for a type of degradation in a quality indicator through previous data. The database may store information about various types of degradation in quality indicators. A combination of quality indicators associated with degradation of a communication quality and a rule identifier (ID) matched to the combination may be stored in the database in advance.

Referring to FIG. 6, the electronic device may continue to monitor whether the communication quality is degraded. The electronic device may determine whether a quality indicator is degraded during a predetermined time interval. The electronic device may record a monitored time interval in a time column 601 of a table of FIG. 6.

The electronic device may display whether a KPI is degraded during each time interval in a KPI degradation column 603 of the table. For example, "TRUE" indicating that the KPI is degraded during a time interval of 15:00 to 16:00 on Jun. 2, 2020, may be recorded in the table. The electronic device may record a rule ID matched to KPI degradation in a matched rule ID column 605. The electronic device may record a combination of related KPIs corresponding to the matched rule ID in a related KPI column 607.

In operation 610, the electronic device may perform RCAs for each anomaly sample in which a KPI is degraded, and may aggregate results of the RCAs. The electronic device may determine a cause of each anomaly sample using a pattern matching scheme. The electronic device may determine a most common cause among one or more causes as a representative cause. The electronic device may display an analysis result of the representative cause in a form of a table.

A time in which a communication quality is reduced may be recorded in a KQI degradation interval column 611. For example, a time from 2020-06-02 15:00 to 2020-06-03 19:00 may be recorded as a time in which the communication quality is reduced.

In a representative rule ID column 613, a representative rule ID that contributes to a representative cause among IDs matched to a combination of quality indicators associated with a reduction in the communication quality may be recorded as "135". In a representative cause column 615, a detailed description of the rule "135" corresponding to the representative cause may be recorded. In a related KPI column 617, a KPI-B indicating a feature associated with the representative cause may be recorded.

Figure 7:
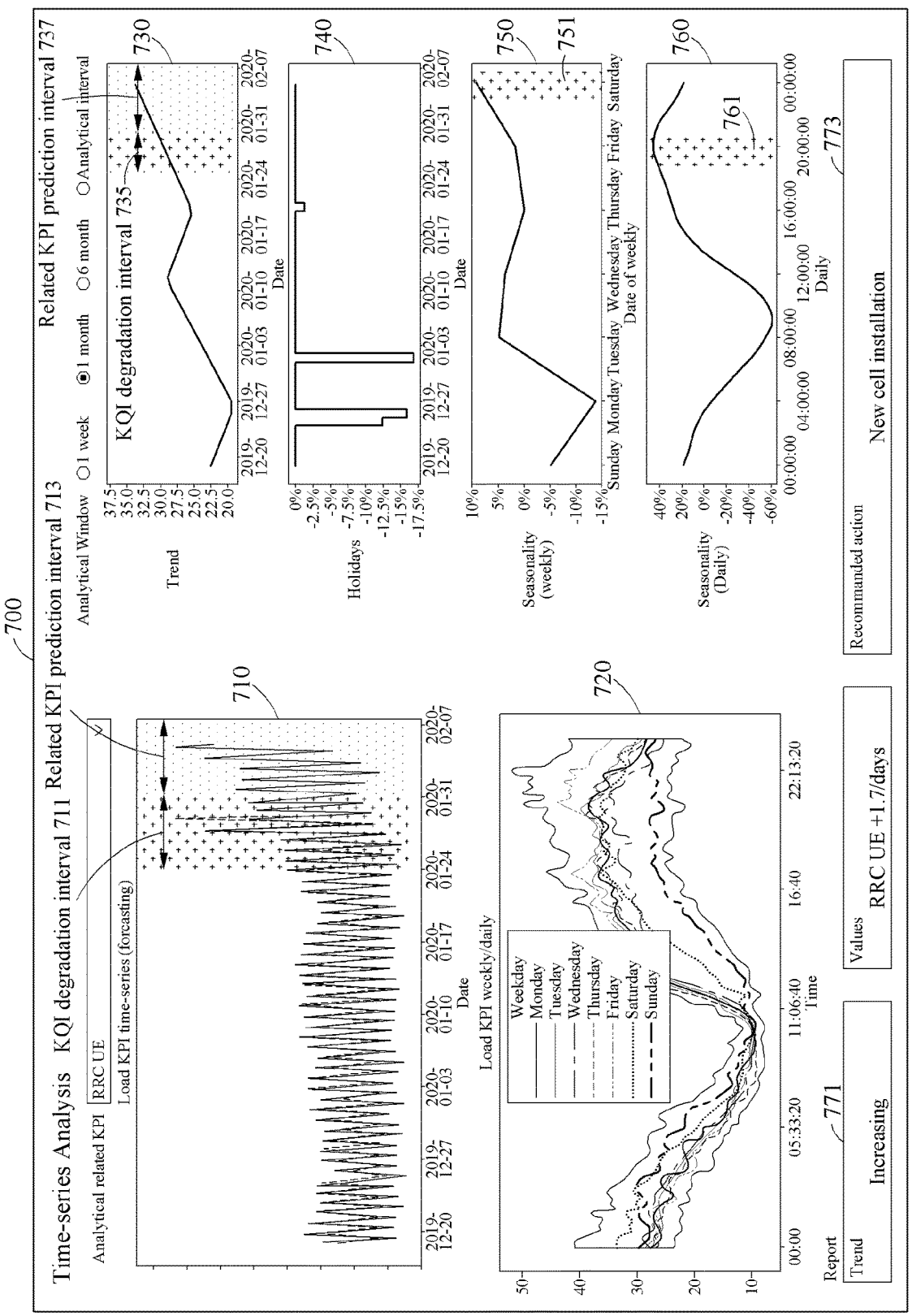
FIG. 7 is a diagram illustrating an example of performing a time-series analysis by an electronic device according to an embodiment of the disclosure.

FIG. 7 is a diagram illustrating an example of performing a time-series analysis by an electronic device according to an embodiment of the disclosure.

An electronic device (e.g., the electronic device 101 of FIG. 1) may visualize a time-series analysis result and provide the visualized time-series analysis result. The electronic device may provide a GUI for displaying a time-series analysis result for a feature associated with a degradation phenomenon of a KPI for an RCA.

Referring to FIG. 7, a GUI 700 may include graphs 710, 720, 730, 740, 750, and 760, and boxes 771 and 773.

The graph 710 may show a quality indicator over time. In the graph 710, a KQI degradation interval 711, which is an interval in which a KQI is greater than or equal to a threshold, may refer to an interval in which the KQI is degraded. A related KPI prediction interval 713 may represent a prediction result of a related KPI predicted by the time-series analysis result of the electronic device.

The graph 720 may show a seasonality derived by a time-series analysis. The graph 720 may show a KPI based on each day of a week.

The graph 730 may show a trend derived by a time-series analysis. In the graph 730, a simplified trend line is shown, a KQI degradation interval 735 may represent an interval in which the trend line is above a threshold, and a related KPI prediction interval 737 may represent a trend line predicted by the time-series analysis.

The graph 740 may show analysis results for holidays. The graph 750 may show a seasonality by a time-series analysis, on a weekly basis. An interval 751 may be a degradation interval. The graph 760 may show a seasonality by a time-series analysis, on a daily basis. An interval 761 may be a degradation interval.

The box 771 may indicate a directionality of a trend. For example, "Increasing" indicating an increase in the trend may be displayed in the box 771. The box 773 may show a proposed solution. For example, "New cell installation" indicating an installation of a new cell may be displayed in the box 773.

FIG. 8 is a diagram illustrating various examples from an analysis of a representative cause to a proposal of a solution by an electronic device according to an embodiment of the disclosure.

Referring to FIG. 8, a table may include a first column 801, a second column 803, a third column 805, a fourth column 807, and a fifth column 809. The first column 801 may indicate a cause category. The second column 803 may indicate an associated feature. The third column 805 may indicate a time-series pattern of associated features. The fourth column 807 may indicate a combined cause. The fifth column 809 may indicate a proposed solution.

A representative cause analyzed by an electronic device (e.g., the electronic device 101 of FIG. 1) may be displayed in the first column 801. For example, "High traffic load" indicating a high load as a representative cause may be displayed in the first column 801.

A feature associated with a representative cause may be displayed in the second column 803. For example, "DL_Active_UEs" indicating a large number of UEs with an activated downloading operation may be displayed in the second column 803.

A time-series pattern of associated features may be displayed in the third column 805. For example, "Lasting increase" indicating that an increase in a number of UEs is maintained may be displayed in the third column 805.

A combined cause obtained by combining a time-series analysis result and a representative cause derived by the electronic device may be displayed in the fourth column 807. For example, "High traffic load with increasing UEs" obtained by combining "High traffic load" that is analyzed as a representative cause with "increasing UEs" that is a time-series analysis result may be displayed in the fourth column 807.

A solution proposed by the electronic device may be displayed in the fifth column 809. For example, "Configure load-balancing related parameters to offload traffic" may be displayed as a scheme of reducing a load by configuring load balancing-related parameters to solve a high load caused by increasing UEs in the fifth column 809, or "Deploy more cells" may be displayed as a scheme of deploying a larger number of cells in the fifth column 809.

Figure 9:
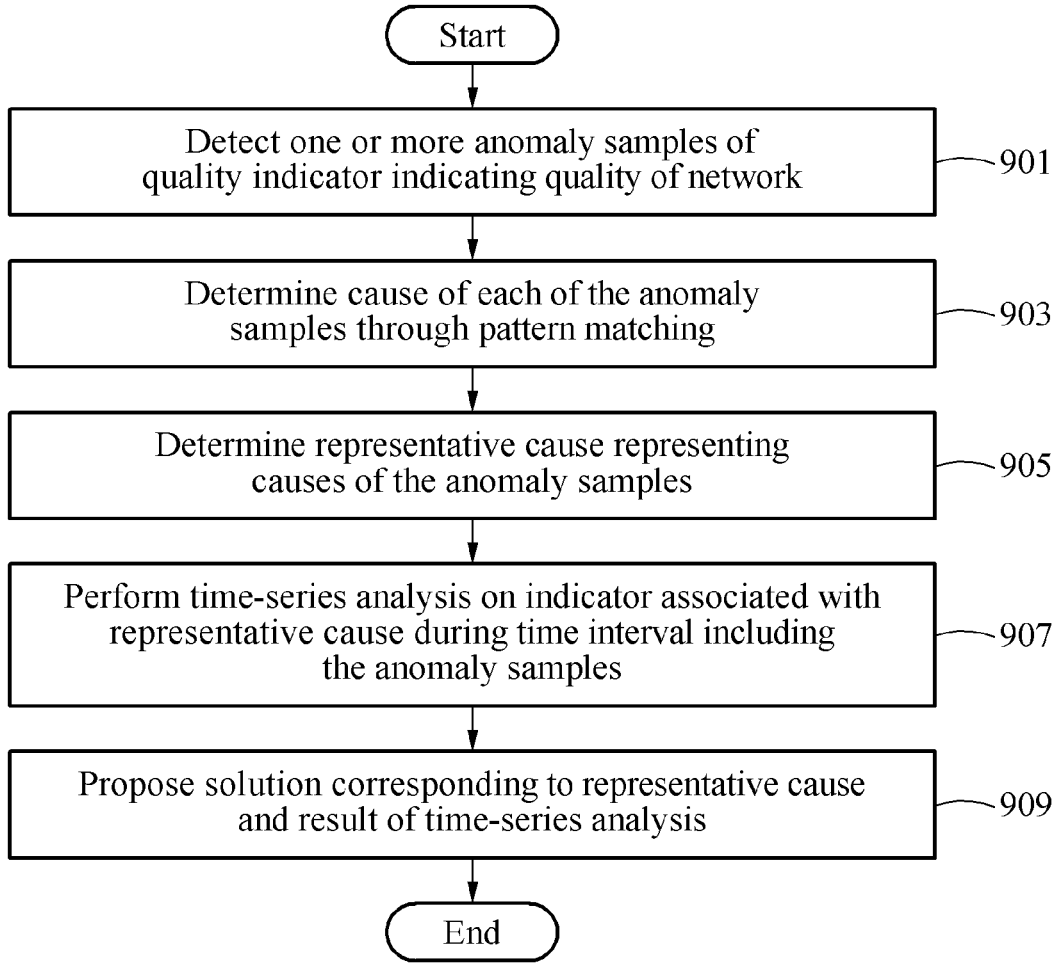
FIG. 9 is a flowchart of a method of solving a problem of a network according to an embodiment of the disclosure.

FIG. 9 is a flowchart of a method of solving a problem of a network according to an embodiment of the disclosure.

Referring to FIG. 9, according to an example embodiment, in operation 901, an electronic device (e.g., the electronic device 101 of FIG. 1) may detect one or more anomaly samples of a quality indicator indicating a quality of the network. A target interval starting from a start time at which a time-series analysis is to be performed may be referred to as a "first time interval".

In operation 903, the electronic device may determine a cause of each of the one or more anomaly samples through pattern matching.

In operation 905, the electronic device may determine a representative cause representing causes of the one or more anomaly samples.

In operation 907, the electronic device may perform a time-series analysis on an indicator associated with the representative cause during a time interval including the one or more anomaly samples. The electronic device may perform the time-series analysis on the indicator associated with the representative cause during a second time interval including the first time interval.

In operation 909, the electronic device may propose a solution corresponding to the representative cause and a result of the time-series analysis.

The electronic device may determine a time corresponding to a predetermined sample prior to a time of a first anomaly sample among the anomaly samples as a start time at which a time-series analysis is to be performed. The electronic device may determine a time corresponding to a predetermined sample prior to a start time of the first time interval as a start time of the second time interval.

The electronic device may analyze a trend, a seasonality or a residual component of the associated indicator during the target interval starting from the start time at which the time-series analysis is to be performed. The electronic device may analyze a trend, a seasonality or a residual component of an associated feature during the second time interval. The electronic device may also perform a time-series analysis on a moving average of the associated feature, a result obtained by performing fitting by a regression model, a prediction value by a prediction algorithm.

The electronic device may perform a time-series analysis using an STL technique or a prophet technique. The electronic device may classify a shape type of the trend. The electronic device may approximate the trend to a linear line and calculate a rate of change of the trend based on an approximation result.

The method of solving the problem of the network may be implemented by a computer program (e.g., the program 240 of FIG. 2). The computer program may be stored in a non-transitory computer-readable recording medium.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   at least one processor,
   wherein the at least one processor is configured to:
      determine a representative cause representing a cause of each anomaly sample of a quality indicator indicating a quality of a network,
      perform a time-series analysis on an indicator associated with the representative cause,
      propose a solution corresponding to the representative cause and a result of the time-series analysis,
      determine a first time interval for detecting an anomaly of the quality indicator indicating the quality of the network,
      detect one or more anomaly samples of the quality indicator of the network during the first time interval,
      determine a representative cause representing a cause of each of the one or more anomaly samples,
      perform a time-series analysis on an indicator associated with the representative cause during a second time interval comprising the first time interval,
      determine the second time interval comprising the first time interval,
      determine the indicator associated with the representative cause,
      perform the time-series analysis on the indicator associated with the representative cause during the second time interval, and
      determine a time corresponding to a predetermined sample prior to a start time of the first time interval as a start time of the second time interval, wherein the at least one processor is configured to:
    determine a cause of each of one or more anomaly samples, and
    determine a representative cause representing causes of the one or more anomaly samples, and
wherein the at least one processor is configured to:
    input the one or more anomaly samples to a neural network that is trained based on a plurality of pieces of training data associated with a corresponding relationship between an anomaly sample and a cause, and
    determine a cause of each of the one or more anomaly samples from an output of the neural network.

2. The electronic device of claim 1, wherein the at least one processor is configured to determine a most common cause among causes of the one or more anomaly samples as the representative cause.

3. The electronic device of claim 1, wherein the processor is configured to analyze a trend, a seasonality or a residual component of the associated indicator during the second time interval.

4. The electronic device of claim 1, wherein the at least one processor is configured to perform a time-series analysis on a moving average of the associated indicator, a result obtained by performing fitting by a regression model, and a prediction value by a prediction algorithm.

5. A method of solving a problem of a network, the method comprising:
    detecting one or more anomaly samples of a quality indicator indicating a quality of the network;
    determining a cause of each of the one or more anomaly samples through pattern matching;
    determining a representative cause representing causes of the one or more anomaly samples;
    performing a time-series analysis on an indicator associated with the representative cause during a time interval comprising the one or more anomaly samples; and
    proposing a solution corresponding to the representative cause and a result of the time-series analysis,
    wherein the performing of the time-series analysis comprises:
        determining a time corresponding to a predetermined sample prior to a time of a first anomaly sample among the anomaly samples as a start time at which the time-series analysis is to be performed, and
        analyzing a trend, a seasonality or a residual component of the associated indicator during a target interval starting from the start time at which the time-series analysis is to be performed,
    wherein the target interval starting from the start time at which the time-series analysis is to be performed is a first time interval,
    wherein the performing of the time-series analysis comprises performing a time-series analysis on the indicator associated with the representative cause during a second time interval comprising the first time interval,
    wherein the determining of the time as the start time comprises determining a time corresponding to a predetermined sample prior to a start time of the first time interval as a start time of the second time interval, and
    wherein the determining of the cause for each of the one or more anomaly samples comprises:
        inputting the one or more anomaly samples to a neural network that is trained based on a plurality of pieces of training data associated with a corresponding relationship between an anomaly sample and a cause; and
        determining a cause of each of the one or more anomaly samples from an output of the neural network.

6. The method of claim 5, further comprising:
    analyzing the trend, the seasonality or the residual component of the associated indicator during the second time interval,
    wherein the analyzing of the trend, the seasonality or the residual component of the associated indicator during the second time interval comprises:
    classifying a shape type of the trend,
    approximating the trend to a linear line, and
    calculating a rate of change of the trend based on a result of the approximating.

7. The method of claim 6, wherein the shape type is a shape of a time series of a trend component.

8. The method of claim 7, further comprising calculating a shape-based distance using a dynamic time warping (DTW) algorithm.

9. The method of claim 8, further comprising classifying the trend component as a shape type corresponding to a sequence with a most similar shape based on the shape-based distance.

10. The method of claim 5, wherein the performing of the time-series analysis on the associated indicator comprises performing a time-series analysis on a moving average of the associated indicator, a result obtained by performing fitting by a regression model, and a prediction value by a prediction algorithm.

11. A non-transitory computer-readable storage medium storing instructions that, when executed by a processor, cause the processor to perform a method comprising:
    detecting one or more anomaly samples of a quality indicator indicating a quality of a network,
    determining a cause of each of the one or more anomaly samples through pattern matching,
    determining a representative cause representing causes of the one or more anomaly samples,
    performing a time-series analysis on an indicator associated with the representative cause during a time interval comprising the one or more anomaly samples, and
    proposing a solution corresponding to the representative cause and a result of the time-series analysis,
    wherein the performing of the time-series analysis comprises:
        determining a time corresponding to a predetermined sample prior to a time of a first anomaly sample among the anomaly samples as a start time at which the time-series analysis is to be performed, and
        analyzing a trend, a seasonality or a residual component of the associated indicator during a target interval starting from the start time at which the time-series analysis is to be performed,
    wherein the target interval starting from the start time at which the time-series analysis is to be performed is a first time interval,
    wherein the performing of the time-series analysis comprises performing a time-series analysis on the indicator associated with the representative cause during a second time interval comprising the first time interval,
    wherein the determining of the time as the start time comprises determining a time corresponding to a predetermined sample prior to a start time of the first time interval as a start time of the second time interval, and
    wherein the determining of the cause for each of the one or more anomaly samples comprises:
        inputting the one or more anomaly samples to a neural network that is trained based on a plurality of pieces of training data associated with a corresponding relationship between an anomaly sample and a cause; and determining a cause of each of the one or more anomaly samples from an output of the neural network.

* * * * *